(12) United States Patent
Chen

(10) Patent No.: US 7,497,309 B2
(45) Date of Patent: Mar. 3, 2009

(54) BICYCLE BRAKE LEVER

(76) Inventor: Jui-Pin Chen, No. 141-2, Sec, 3, Chungshan Rd., Changhua City, Changhua Hsien (TW)

( * ) Notice: Subject to any disclaimer, the term of this patent is extended or adjusted under 35 U.S.C. 154(b) by 361 days.

(21) Appl. No.: 11/374,106

(22) Filed: Mar. 14, 2006

(65) Prior Publication Data
US 2007/0215416 A1    Sep. 20, 2007

(51) Int. Cl.
*B60T 11/00* (2006.01)

(52) U.S. Cl. .................... 188/344; 188/24.22

(58) Field of Classification Search ............ 188/344, 188/352, 151 R, 24.22, 2 D, 72.1, 72.4; 60/588, 60/592, 594, 584, 586; 92/169.1–169.4, 92/171.1; 74/551.8, 501.5 H
See application file for complete search history.

(56) References Cited

U.S. PATENT DOCUMENTS

| | | | | |
|---|---|---|---|---|
| 2,759,329 A * | 8/1956 | Ponti | ........................ | 60/588 |
| 3,554,334 A * | 1/1971 | Shimano et al. | ............ | 188/344 |
| 3,802,200 A * | 4/1974 | Kolm | ........................ | 60/594 |
| 4,162,616 A * | 7/1979 | Hayashida | ................. | 60/533 |
| 4,407,125 A * | 10/1983 | Parsons | ..................... | 60/584 |
| 4,788,821 A * | 12/1988 | Mienko et al. | ............... | 60/585 |
| 6,003,639 A * | 12/1999 | Buckley et al. | ............... | 188/26 |
| 6,370,877 B1 * | 4/2002 | Lin | ........................... | 60/588 |
| 2003/0121736 A1 * | 7/2003 | Lumpkin | .............. | 188/151 R |

* cited by examiner

*Primary Examiner*—Xuan Lan Nguyen
(74) *Attorney, Agent, or Firm*—William E. Pelton, Esq.; Cooper & Dunham LLP

(57) ABSTRACT

A bicycle brake lever is used on a handlebar of a bicycle and has a body, a hydraulic cylinder, an oil jacket, a cap and a leakage proof element. The body is mounted with the handlebar of the bicycle and has a threaded hole and a lever. The hydraulic cylinder is mounted on the body and has an oil chamber, a piston and an annular groove. The piston is mounted moveably in the oil chamber and is connected with the lever. The annular groove is formed around the external surface of the hydraulic cylinder and has two transmitting holes. The oil jacket is mounted rotatably around the hydraulic cylinder over the annular groove and contacts with the body near the threaded hole and has a tube. The cap is mounted over the opening of the tube. The leakage proof element is mounted between the opening of the tube and the cap.

11 Claims, 4 Drawing Sheets

BICYCLE BRAKE LEVER

BACKGROUND OF THE INVENTION

1. Field of the Invention

The present invention relates to a bicycle brake lever and more particularly to a bicycle brake lever that has an oil jacket and can check the amount of the oil in the oil jacket easily and conveniently.

2. Description of Related Art

A conventional bicycle brake system usually mounted on a bicycle having a front wheel, a rear wheel and a handlebar, and has a lever, a brake and a pipe. The lever is mounted around the handlebar of the bicycle. The brake is mounted on the bicycle near the front wheel or the rear wheel. The pipe is mounted between the lever and the brake and contains oil inside of the pipe. A user can pull or press the lever to actuate the brake with the oil pressure inside the pipe and to make the bicycle to slow down or stop.

The braking efficacy of the conventional bicycle brake system is usually reduced the due to the wastage and the leakage of the oil inside the pipe. Therefore, an open-loop bicycle brake system is provided to solve aforementioned problem and has an oil tank that is mounted on the lever and communicates with the pipe. The oil tank can supply oil into the pipe and provide a compensating effect to keep the brake system at an excellent operative condition.

However, the conventional open-loop bicycle system has the following defects and shortcomings.

1. The oil tank of the conventional open-loop bicycle brake system is usually made of metal or plastics, and users cannot check the amount of the oil in the oil tank directly. If the oil inside the oil tank cannot be supplied in time, brake effect of the conventional brake system will be reduced to easily cause a traffic accident.

2. In order to match the habits of different users, the lever is mounted adjustably around the handlebar of the bicycle. When the user adjusts the angle between the lever and the handlebar over an inclined angle, the oil easily leaks from a gap between the oil tank and a cock attached to the oil tank to close the oil tank. Therefore, the adjust angle between the lever and the handlebar is restricted at a small angular range.

SUMMARY OF THE INVENTION

The main objective of the present invention is to provide a bicycle brake lever and more particularly to a bicycle brake lever that has a translucent oil jacket and can check the amount of the oil in the oil jacket easily and conveniently.

The bicycle brake lever has a body, a hydraulic cylinder, an oil jacket, a cap and a leakage proof element. The body is mounted on a handlebar of a bicycle and has a threaded hole and a lever. The hydraulic cylinder is mounted on the body and has an oil chamber, a piston and an annular groove. The piston is mounted moveably in the oil chamber and is connected with the lever. The annular groove is formed around the external surface of the hydraulic cylinder and has two transmitting holes. The oil jacket is mounted rotatably around the hydraulic cylinder over the annular groove and contacts with the body near the threaded hole and has a tube. The cap is mounted over the opening of the tube. The leakage proof element is mounted between the opening of the tube and the cap.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
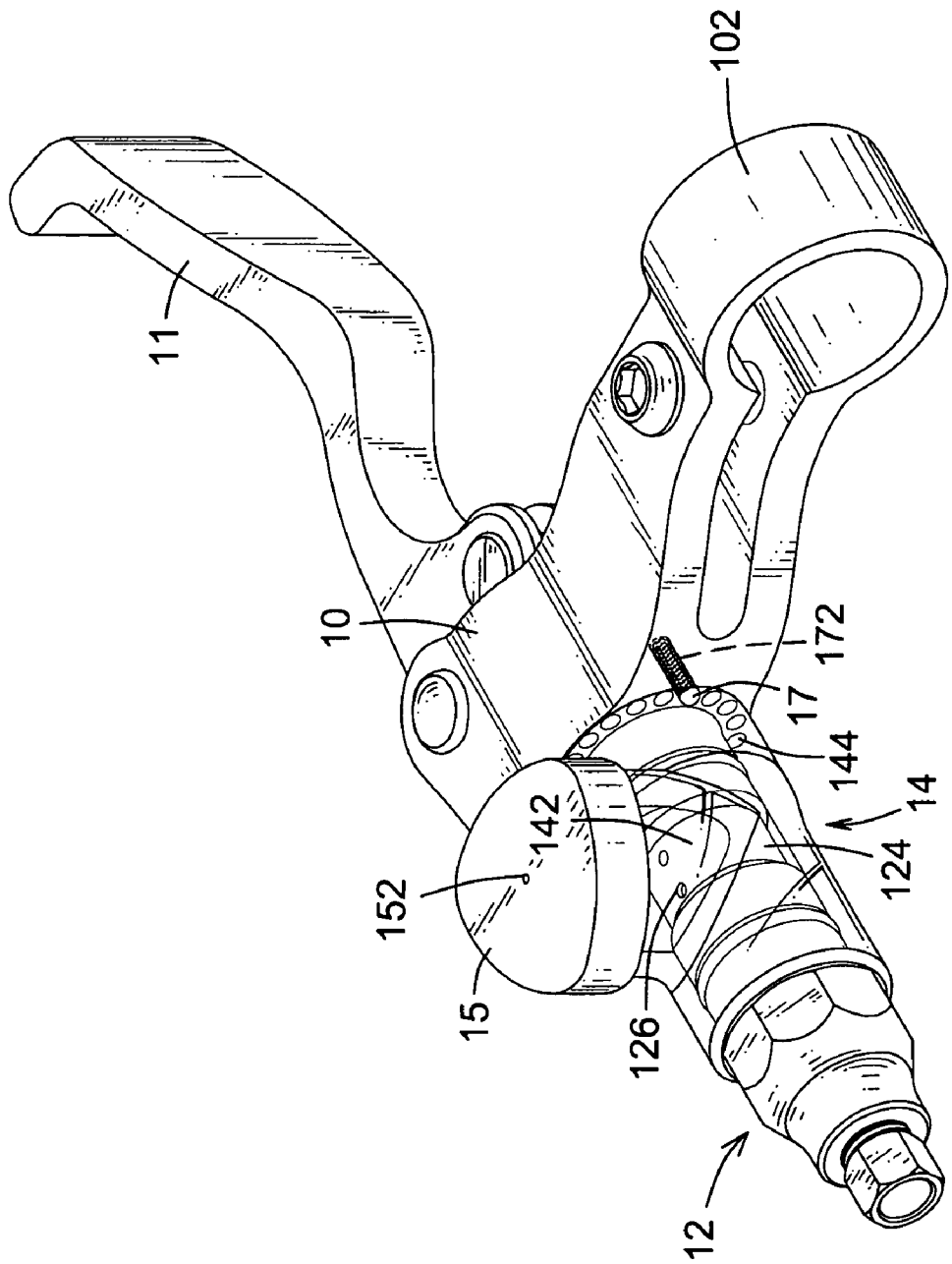
FIG. 1 is a perspective view of a bicycle brake lever in accordance with the present invention.
Figure 2:
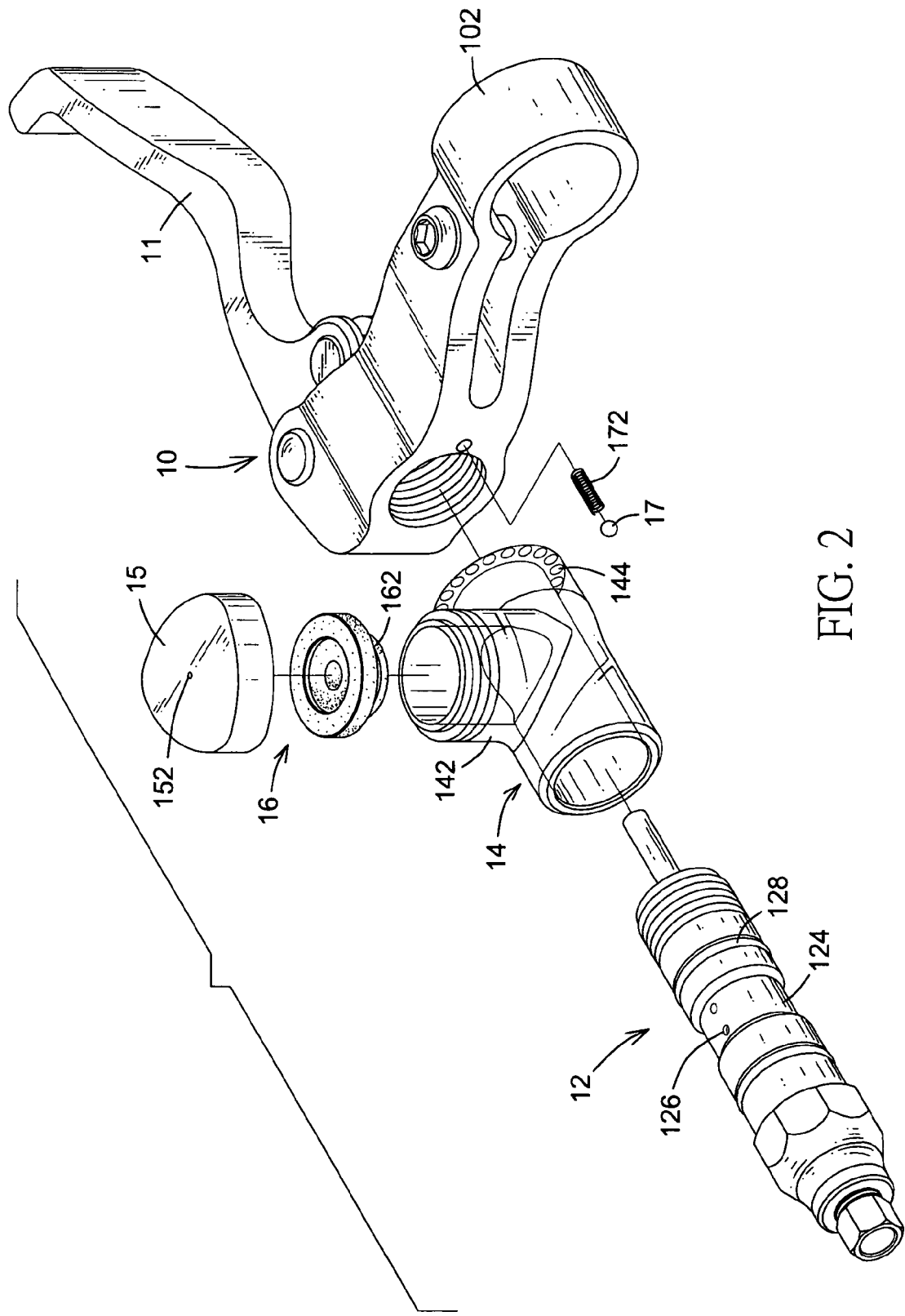
FIG. 2 is an exploded perspective view of the bicycle brake lever in FIG. 1.
Figure 3:
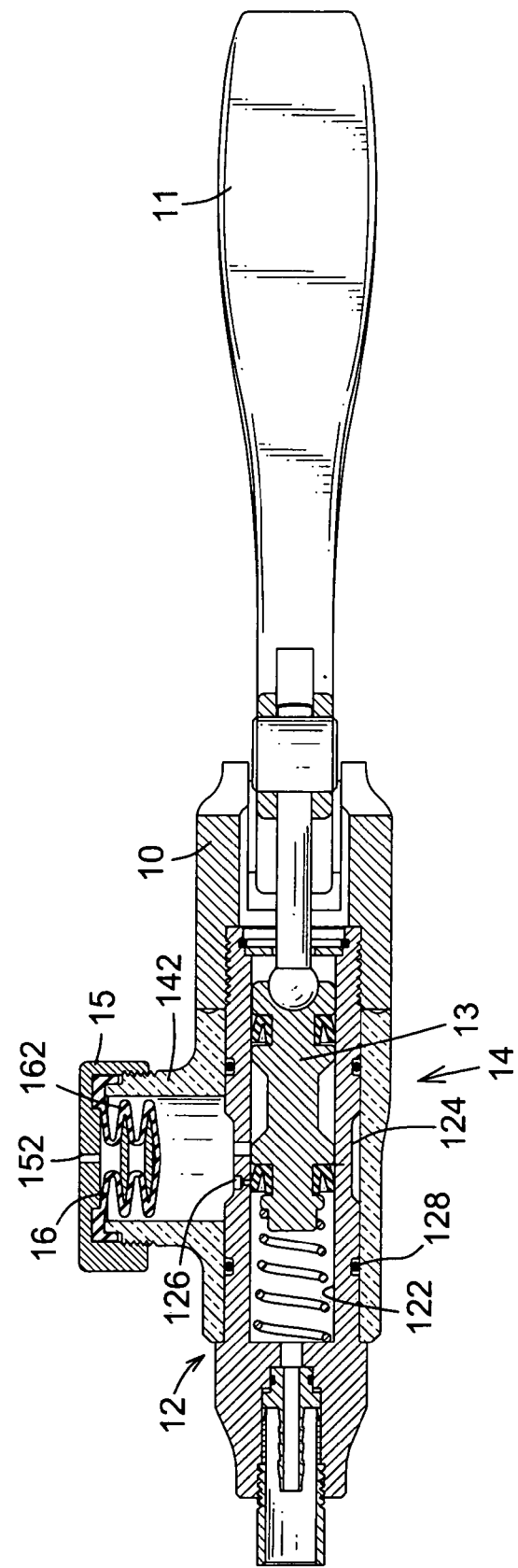
FIG. 3 is an operational side view in partial section of the bicycle brake lever in FIG. 1.

With further reference to FIGS. 1 to 3, the bicycle brake lever is used on a handlebar of a bicycle and comprises a body (10), a hydraulic cylinder (12), an oil jacket (14), a cap (15) and a leakage proof element (16).

The body (10) is mounted on the handlebar of the bicycle and has a threaded hole, a mounting hole, a connecting collar (102), a lever (11), a ball (17) and a spring (172). The threaded hole is defined in the body (10). The connecting collar (102) is formed transversely on the body (10), can be a C-shaped or an O-shaped and are used to mount rotatably around the handlebar of the bicycle. The lever (11) is mounted pivotally with the body (10) near the threaded hole and has a shaft extending into the threaded hole. The mounting hole is formed on the body (10) between the threaded hole and the connecting collar (102) oppositely the lever (11). The ball (17) is mounted in the mounting hole. The spring (172) is mounted in the mounting hole and presses against the ball (17).

The hydraulic cylinder (12) is tubular, is mounted on the body (10) and has a proximal end, a distal end, an external surface, a outer thread, an oil chamber (122), a piston (13), an annular groove (124) and two O-rings (128). The outer thread is formed around the external surface near the proximal end of the hydraulic cylinder (12) and is screwed with the threaded hole of the body (10). The oil chamber (122) is formed inside the hydraulic cylinder (12). The piston (13) is mounted moveably in the oil chamber (122) and has a front end and a rear end. The front end of the piston (13) is connected to the shaft of the lever (11). The annular groove (124) is formed around the external surface between the proximal end and the distal end of the hydraulic cylinder (12) and has two transmitting holes (126). The transmitting holes (126) are formed longitudinally through the bottom of the annular groove (124) and communicate with the oil chamber (122). The O-rings (128) are respectively mounted around the hydraulic cylinder (12) respectively at two sides of the annular groove (124).

The oil jacket (14) is hollow and made of translucent material, is mounted rotatably around the hydraulic cylinder (12) over the annular groove (124), contacts with the body (10) near the threaded hole and has a rear open end, a front open end, a tube (142) and multiple positioning holes (144). The hydraulic cylinder (12) is extended through the oil jacket (14) from the rear open end to the front open end and is screwed with the body (10). The front open end of the oil jacket (14) is attached to the body (10) and over the threaded hole and contacts with the ball (17). The tube (142) is hollow and made of translucent material, is formed radially on the oil jacket (14) at a position corresponding to the annular groove (124) and has an opening. The positioning holes (144) are formed around the front open end of the oil jacket (14) and one of the positioning holes (144) corresponds to the mounting hole in the body (10). The ball (17) is engaged with the corresponding positioning hole (144) with the biasing force provided by the spring (172) to hold the oil jacket (14) in place.

The cap (15) is mounted over the opening of the tube (142) and has a center and a through hole (152). The through hole (152) is formed through the center of the cap (15) and communicates with the opening of the tube (142).

The leakage proof element (16) is mounted between the opening of the tube (142) and the cap (15) to prevent the oil from leaking from the oil jacket (14), and has a center and an elastic element (162). The elastic element (162) is formed on the center and protrudes into the tube (142).

With further reference to FIG. 3, when the lever (11) is pressed or pulled, the piston (13) will move to the proximal end of the hydraulic cylinder (12) to pressurize the oil inside the oil chamber (122) and actuate the brake to stop or slow down the bicycle. The oil inside the tube (142) of the oil jacket (14) can flow into the oil chamber (122) through the transmitting holes (126) to provide a compensation effect to the oil inside the hydraulic cylinder (12). Users can refill the oil into the tube (142) from the opening when the oil inside the hydraulic cylinder is wasted and the cap (15) is detached from the tube (142). The O-rings (128) mounted over the hydraulic cylinder (12) can prevent the oil from leaking between the hydraulic press (12) and the oil jacket (14).

Figure 4:
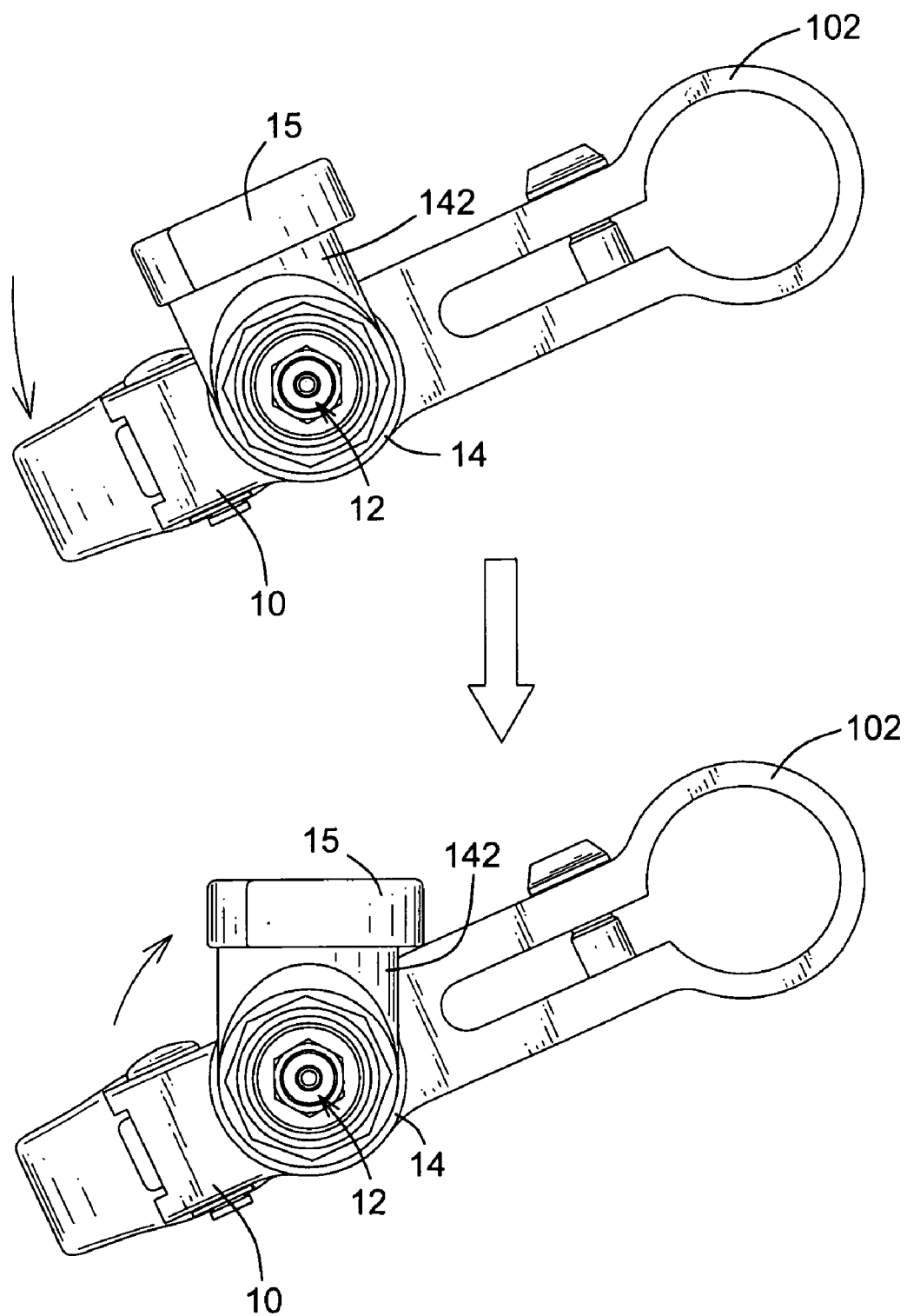
FIG. 4 is an operational side view of the bicycle brake lever in FIG. 1.

With reference to FIG. 4, when users adjust the angle between the body (10) and the handlebar, the oil jacket (14) can be turned relative to the hydraulic cylinder (12) to keep the opening always upward to prevent the oil leaking from the opening of the tube (142) even when the body (10) is rotated to a position where the lever (11) is located below the handlebar.

The bicycle brake lever in accordance with the present invention has the following advantages.

1. The oil in the tube (142) can flow into the oil chamber (122) through the transmitting holes (126) to provide a compensating effect to the bicycle brake system and control the bicycle safely and precisely.

2. The oil jacket (14) can be turned around the hydraulic cylinder (12) and is held in place with the ball (17) engaging with one of the positioning holes (144) to made the opening of the tube (142) always upward. Thus, the adjust angle between the body (10) and the handlebar is not restricted but is enlarged, such that the use of the brake lever in accordance with the present invention is versatile.

3. The oil jacket (14) and the tube (142) are made of translucent material, and users can check the amount of the oil in the tube (142) directly. When the oil in the tube (142) wastes out, users can supply the oil into the tube (142) in time and prevent a traffic accident from occurring.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A bicycle brake lever for being used on a handlebar of a bicycle and having
    a body adapted for being mounted with the handlebar of the bicycle and having
        a threaded hole defined in the body;
        a connecting collar formed on the body and used to mount rotatably around the handlebar of the bicycle; and
        a lever mounted pivotally with the body near the threaded hole and having a shaft extending into the threaded hole;
    a hydraulic cylinder mounted on the body and having
        a proximal end;
        a distal end;
        an external surface;
        an outer thread formed around the external surface near the proximal end of the hydraulic cylinder and screwed with the threaded hole of the body;
        an oil chamber formed inside the hydraulic cylinder;
        a piston mounted moveably in the oil chamber and having
            a front end connected with the shaft of the lever; and
            a rear end; and
        an annular groove formed around the external surface between the proximal end and the distal end of the hydraulic cylinder and having two transmitting holes formed longitudinally through a bottom of the annular groove and communicating with the oil chamber;
    an oil jacket mounted rotatably around the hydraulic cylinder over the annular groove, contacting with the body near the threaded hole and having
        a rear open end;
        a front open end contacting with the body and over the threaded hole; and
        a tube formed radially on the oil jacket at a position corresponding to the annular groove and having an opening;
    a cap mounted over the opening of the tube; and
    a leakage proof element mounted between the opening of the tube and the cap to prevent the oil leaking from the oil jacket.

2. The bicycle brake lever as claimed in claim 1, wherein the oil jacket and the tube are hollow and made of translucent material.

3. The bicycle brake lever as claimed in claim 2, wherein the hydraulic cylinder has two O-rings mounted around the hydraulic cylinder respectively at two sides of the annular groove and contacting with the oil jacket.

4. The bicycle brake lever as claimed in claim 3, wherein the cap has
    a center; and
    a through hole formed through the center of the cap and communicating with the opening of the tube; and
the leakage proof element has
    a center; and
    an elastic element formed on the center and protruding into the tube.

5. The bicycle brake lever as claimed in claim 4, wherein the body has
    a mounting hole formed on the body between the threaded hole and the connecting collar;
    a ball mounted in the mounting hole; and
    a spring mounted in the mounting hole and pressing against the ball; and
the oil jacket has
    multiple positioning holes formed around the front open end of the oil jacket, wherein the ball is engaged with one of the positioning holes with a biasing force provided by the spring to hold the oil jacket in place.

6. The bicycle brake lever as claimed in claim 2, wherein the cap has
    a center; and
    a through hole formed through the center of the cap and communicating with the opening of the tube; and
the leakage proof element having a center; and an elastic element mounted on the center and protruding into the tube.

7. The bicycle brake lever as claimed in claim 6, wherein the body has a mounting hole formed on the body between the threaded hole and the connecting collar;

a ball mounted in the mounting hole; and a spring mounted in the mounting hole and pressing against the ball; and the oil jacket has multiple positioning holes formed around the front open end of the oil jacket, wherein the ball is engaged with one of the positioning holes with a biasing force provided by the spring to hold the oil jacket in place.

8. The bicycle brake lever as claimed in claim 2, wherein the body has a mounting hole formed on the body between the threaded hole and the connecting collar;

a ball mounted in the mounting hole; and a spring mounted in the mounting hole and pressing against the ball; and the oil jacket has multiple positioning holes formed around the front open end of the oil jacket, wherein the ball is engaged with one of the positioning holes with a biasing force provided by the spring to hold the oil jacket in place.

9. The bicycle brake lever as claimed in claim 1, wherein the hydraulic cylinder has two O-rings mounted around the hydraulic cylinder respectively at two sides of the annular groove and contacting with the oil jacket.

10. The bicycle brake lever as claimed in claim 1, wherein the cap has a center; and a through hole formed through the center of the cap and communicating with the opening of the tube; and the leakage proof element having a center; and an elastic element mounted on the center and protruding into the tube.

11. The bicycle brake lever as claimed in claim 1, wherein the body has a mounting hole formed on the body between the threaded hole and the connecting collar;

a ball mounted in the mounting hole; and a spring mounted in the mounting hole and pressing against the ball; and the oil jacket has multiple positioning holes formed around the front open end of the oil jacket, wherein the ball is engaged with one of the positioning holes with a biasing force provided by the spring to hold the oil jacket in place.

* * * * *